United States Patent [19]
Bourguignon et al.

[11] Patent Number: 5,553,157
[45] Date of Patent: Sep. 3, 1996

[54] METHOD FOR THE PROCESSING OF THE IMAGES OF A BATCH OF IMAGES

[75] Inventors: Michel Bourguignon, Sceaux; Hafida Berrah, Vitry/Seine; Christoph Thöl, Outarville, all of France

[73] Assignee: Sopha Medical, Buc Cedex, France

[21] Appl. No.: 171,459

[22] Filed: Dec. 22, 1993

[30] Foreign Application Priority Data

Dec. 24, 1992 [FR] France .................................. 92 15721

[51] Int. Cl.$^6$ ................................................. G06K 9/00
[52] U.S. Cl. ........................ 382/131; 382/263; 382/275; 382/280
[58] Field of Search ............................... 382/6, 43, 1, 54, 382/128, 131, 254, 263, 275, 280; 348/77; 364/413.13, 413.2

[56] References Cited

U.S. PATENT DOCUMENTS

| | | | |
|---|---|---|---|
| 4,335,427 | 6/1982 | Hunt et al. | 364/414 |
| 5,112,129 | 5/1992 | Davidson et al. | 382/43 |
| 5,148,499 | 9/1992 | Matsumura | 382/6 |
| 5,173,788 | 12/1992 | Ohta | 382/43 |
| 5,341,435 | 8/1994 | Corbett et al. | 382/43 |

OTHER PUBLICATIONS

"Filters and Fourier Analysis of Gated Blood Pool Studies: A Search for the Optimal Combination", H. Valette et al, Phys. Med. Biol., 1990, vol. 35, No. 1, pp. 1–9.

"Multidimensional Filtering Using Combined Discrete Fourier Transform and Linear Difference Equation Methods", A. A. Choudhury et al, IEEE Transactions on Circuits and Systems, 37(1990) Feb., No. 2, pp. 223–231.

"Digital Image Processing Applied to Scintillation Images from Biomedical Systems", Varoutas et al, IEEE Transactions on Biomedical Engineering, vol. 24, No. 4, Jul. 1977, pp. 337–347.

"Computer and Optical Processing of Radioisotope Scans Using the Fourier and Other Transformations", D. Brown et al, Comp. Applications in Radiology 23, Sep. 1970, pp. 561–579.

*Primary Examiner*—Leo Boudreau
*Assistant Examiner*—David R. Anderson
*Attorney, Agent, or Firm*—William L. Feeney; Kerkam, Stowell, Kondracki & Clarke, P.C.

[57] ABSTRACT

The noise is eliminated from the images by carrying out a first Fourier transform of the images of an original batch of images. Each of these transformed images is then broken down into Fourier series to reveal the main harmonics of a periodic evolution of the original images and of the transformed images. This harmonic breakdown is used to recompose transformed images that are thus filtered by the abandoning of the non-useful harmonics. The filtered transformed images are used to carry out a reverse Fourier transform to obtain, ultimately, filtered original images. It is shown that the filtering in this case removes the noise without lowering the quality of the structures of the image, without distributing the noise among all these structures.

20 Claims, 3 Drawing Sheets

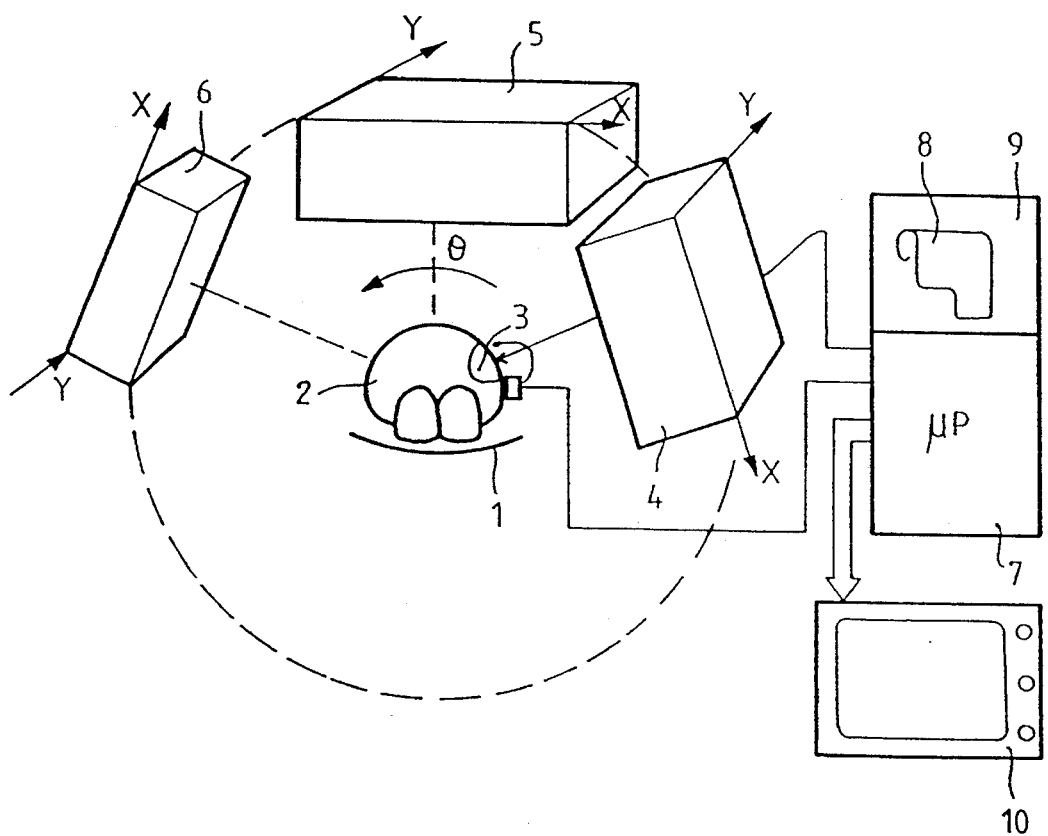
FIG_1
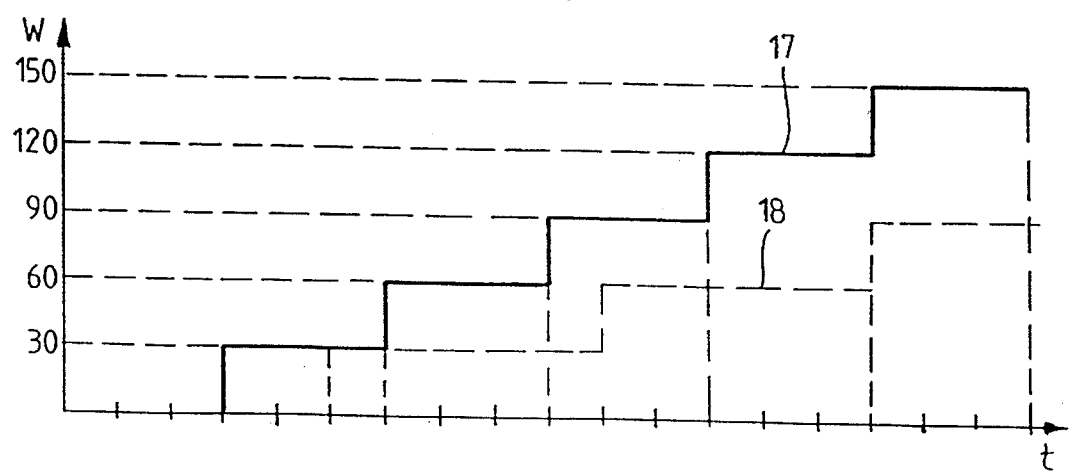
FIG_6

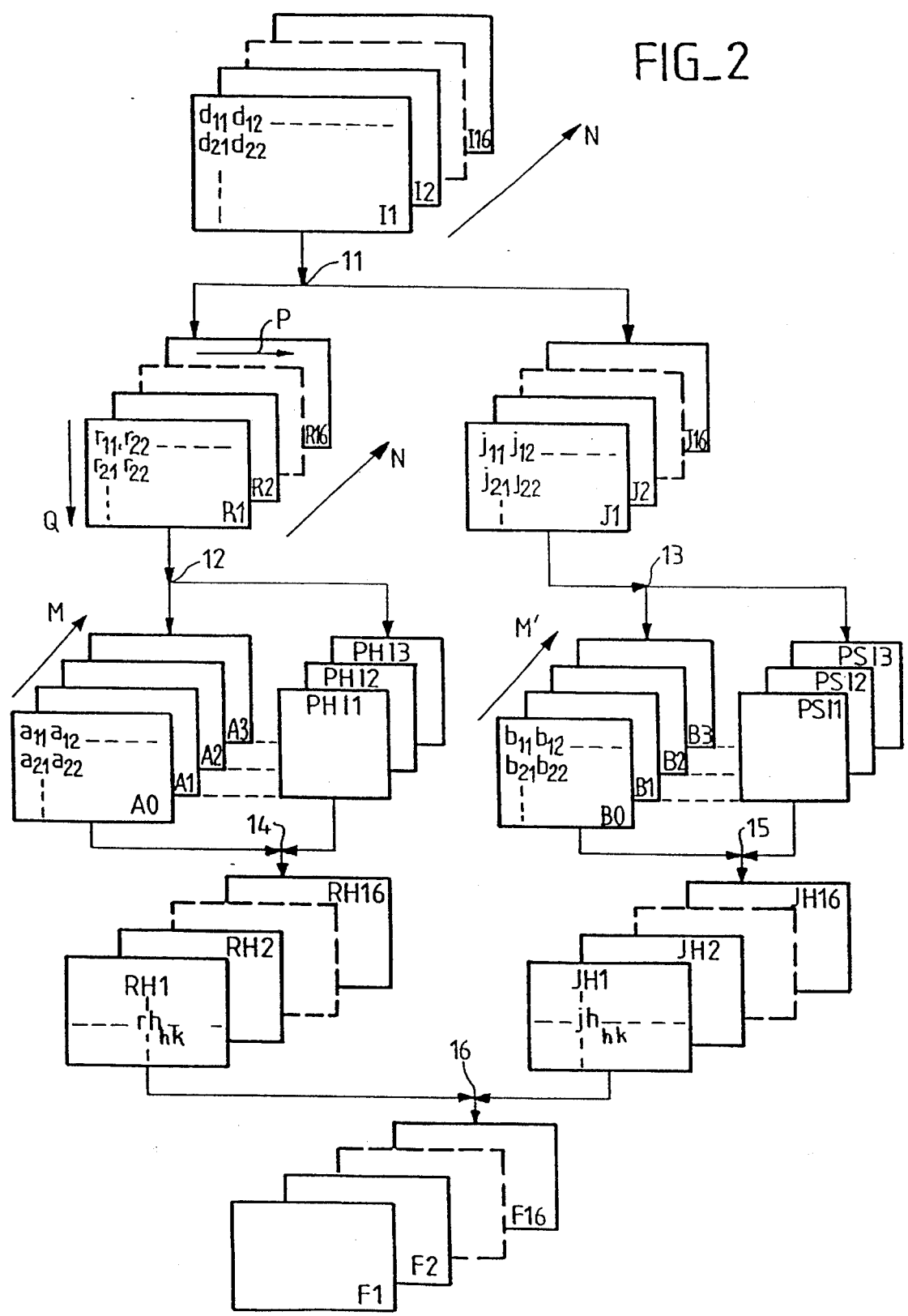
FIG_2

FIG_3
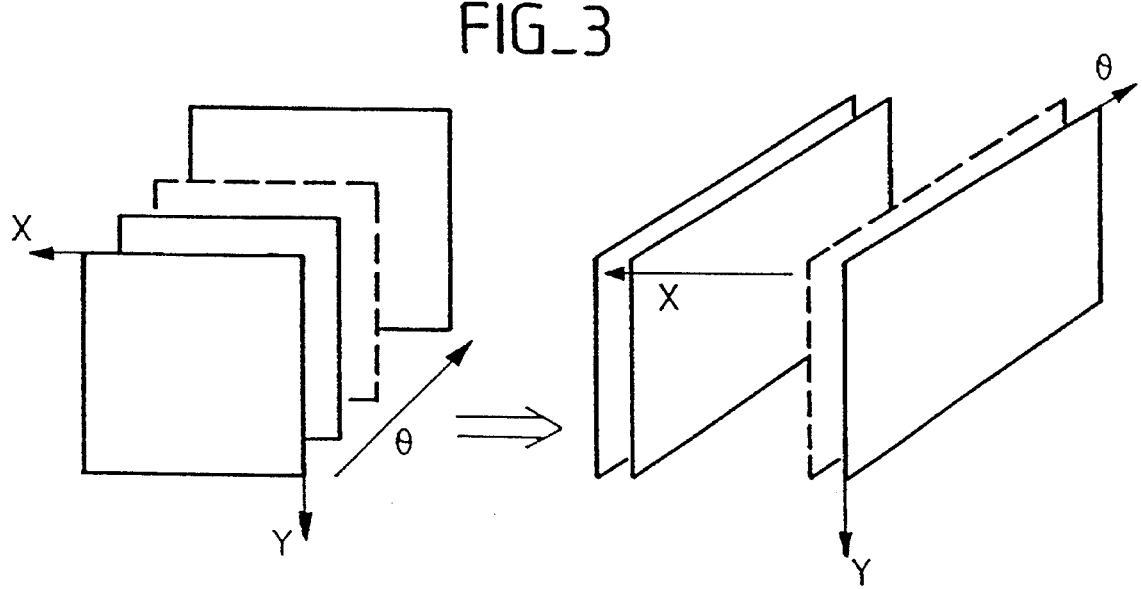
FIG_4
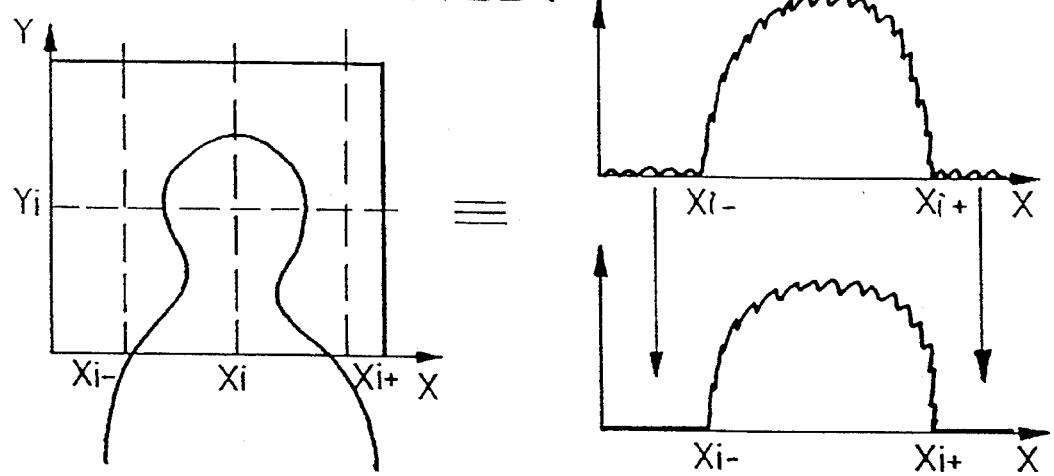
FIG_5
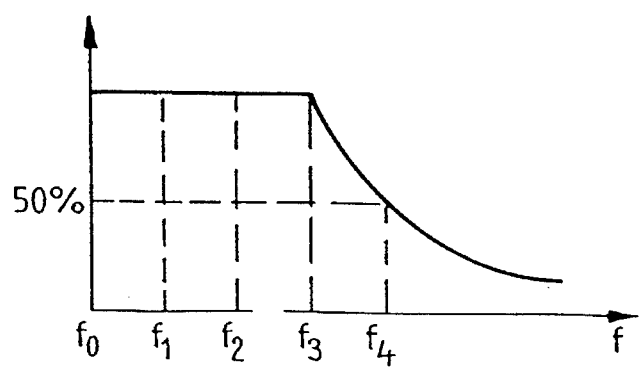

METHOD FOR THE PROCESSING OF THE IMAGES OF A BATCH OF IMAGES

BACKGROUND OF THE INVENTION

1. Field of the Invention

An object of the present invention is a method for the processing of the image of a batch of images, particularly a batch of images obtained by means of a gamma camera. The invention may, however, be applied to images obtained with other medical protocols and, possibly, even images obtained by direct display with a standard type of camera. The processing of the images in the invention preferably relates to the processing of digitized images, namely images whose pixels, which have a given resolution in the image, are assigned image signals that are assessed digitally, most usually in binary mode. The invention relates more particularly to batches of images pertaining to periodic phenomena. A periodic phenomenon may be a phenomenon that evolves in time such as for example heart beats, or it may be a static phenomenon but one that is observed from a viewpoint that periodically returns to the same place.

2. Description of the Prior Art

The essential problem that is sought to be resolved in image processing is that of the elimination of noise. Noise is particularly appreciable in the acquisition of scintigraphic images with gamma cameras. Indeed, the principle of these instruments lies in the counting, for each pixel of the image, of the number of occurrences of radioactive transmissions coming from a particular place in an examined body and corresponding to this pixel in the image. The principle of these instruments is described in the American patent application by Anger, No. 3.011,057. In the field of heart monitoring by gamma cameras, it is customary to make images whose resolution is of the order of 64×64 pixels to 128×128 pixels. For each pixel, it is possible to accumulate up to 32,000 occurrences or strokes. The number of strokes accumulated for each place is directly proportional to the total period of acquisition of the image.

It can be shown that the influence of the noise in a scintigraphic image decreases with the number of strokes counted for each pixel. For example, the signal-to-noise ratio evolves as the square root of the average number of strokes counted. The tradeoff, however, is that an excessively large number of strokes counted leads to an image being acquired at excessively low speed. The problem arises essentially for the acquisitions of periodic phenomena, especially those pertaining to the functioning of the heart, for which it is sought to obtain images of this organ in different states of its motion. For example, it is habitual to split up the motions of the heart (whose beat is about 1 second) into sixteen successive images pertaining to each of these states.

The estimates given in the present description are presented solely in order to clarify the picture, and can in no way lead to restricting the field of protection of the invention to values within the ranges indicated.

Given the fleeting character of each of the sixteen states of the heart during its period and given the duration needed to acquire a high-quality image (generally 30 seconds), it is necessary to resort to a technique of synchronization during which the strokes counted are assigned, at a given instant, to the image of the state of the heart corresponding to a state identified temporally with respect to a date of synchronization. Thus, sixteen states are identified and, gradually, sixteen images are formed by the accumulation, respectively, in each of these images, of the strokes counted out during the corresponding periods. The problem is clearly even more complex if it is sought to obtain images with a resolution of 128×128 pixels and 32 images per heart cycle. In general, the reference point of the synchronization corresponds to the start of the cardiac cycle, i.e. the instant when the left ventricle is filled.

Furthermore, even if it were desired to accumulate strokes on a large number of cardiac cycles, for example more than 60 cycles (which corresponds to one minute), as is the usual practice, this could not lead to satisfactory results since, for the heart, the rhythm is not constant but depends on environmental conditions such as effort or exertion. Furthermore, the markers used and injected into the patient's body to create the scintigraphy image may be metabolized by the human body. Their radioactivity diminishes and, at the end of a certain period of time, the number of strokes that can be counted per period becomes insufficient.

Finally, another phenomenon comes into play: this is the choice of the marker injected into the patient's body. The marker generally chosen for injection in cardiac applications is thallium whose radioactive half-life is, unfortunately, 73 hours, whereas 99 m technetium, which is used for other applications but is less useful for the heart because it cannot be used alone, has a shorter radioactive half-life of the order of 6 hours. Thallium is preferred because it has the advantage of fixing well in the walls of the heart and, therefore, by the presence of this marker in the walls, of properly revealing the position of these walls. Unfortunately its greater half-life makes it necessary, in order to avoid traumatizing the patient with excessively large radioactive doses (proportional to the radioactive half-life of the marker) to inject smaller quantities of radioactive material. This again has the result of reducing the number of countable strokes.

The result of all these constraints is the obtaining of images with few strokes per pixel, hence images that are highly noise-ridden.

Examinations of another type have the same type of problem. These examinations are tomographies. In these tomographies, the individual being examined is supposed to be still, and the detector of the gamma camera is made to rotate about him so as to acquire a certain number of images or views, generally 64 of them. Since the acquisition of an image takes about 30 seconds, it means leaving the patient on the examination couch for about half an hour. It is hard to obtain a situation where the patient remains absolutely still during this period. The most irksome phenomenon in this type of examination is the metabolization of the marker and the fact that it is carried into the kidneys, namely into a pair of organs that are generally not monitored. The useful marking decreases accordingly. Thus, the number of strokes counted by images is ultimately small, and the images of the views are also noise-ridden.

To resolve the problems of noise in the images, various types of processing have been devised and perfected, notably in radiology. These processing operations are generally aimed at carrying out a spatial filtering of the image. A filtering such as this has the effect of modifying the image signal at a pixel so as to average it with the image signal of the neighboring pixels. This type of filtering, which may be tolerable when the resolution is very great (1024×1024 pixels) is hardly acceptable when the resolution is low as is generally the case in scintigraphy. In any case, it is done to the detriment of the precision of the image and to the detriment of the final resolution obtained.

There is another known type of processing. In this type of processing, it is assumed, for each pixel, that the image signal at this pixel evolves periodically as the general phenomen that is studied. This periodic evolution may be subjected to breakdown into Fourier series as a function of the harmonics of the variation of the phenomenon studied. In practice, a Fourier transform is carried out to recognize the amplitude and phase of each of the harmonics of the phenomenon. It has been shown that, for a batch of 16 images corresponding to 16 states of the heart, no statistically appreciable difference, measured with a $khi^2$ test, is obtained between the 16 noise-ridden images obtained directly and 16 images that can be obtained again from the breakdown harmonics. This breakdown is of the following type:

$$A\ (t)=A_0=A_1 \cos (2\pi f_1 t+Phi_1)+A_2 \cos (4\pi f_1 t+Phi_2)+A_3 \cos (6\pi f_1 t+phi_3) \quad \text{FORMULA I}$$

In this formula, A is the luminance of a pixel, $f_1$ is the frequency of the heartbeat and t is the time. To obtain the sixteen images, it is enough to give t a value ranging from 0 to 16 times the value of one-sixteenth of the period equal to $1/f^1$. It appears, however, that this type of filtering, which eliminates the harmonics beyond the third harmonic, is not a good filtering. It does eliminate the noise and the image does becomes more agreeable to look at but, in practice, it proves to be false, and it no longer reveals the phenomenon being studied owing to the elimination of its high frequencies.

An object of the invention is to overcome these drawbacks by a filtering processing operation that is applied no longer to the images obtained directly by the medical acquisition protocol or another protocol but to the analytic transformations of these images. In other words, to simplify matters, the sixteen initial images are taken. Analytic transforms are produced therefrom to obtain transformed images each having a real part and an imaginary part. The filtering of the noise is done on these transformed images. Preferably, the filtering is of the type referred to here above. However, it could be of a different type. Once this filtering is done, a reverse analytic transform is performed to return to images of a same type as the initial images. And a notable improvement is observed in the elimination of the noise.

The analytic transform in question is a spatial analytic transform which is preferably a Fourier transform, but it could also be a Z transform or any other mode of transformation. There is then a very sharp improvement, that is visible to the naked eye, of the signal-to-noise ratio of the images presented without incorporation of the noise in the image. Ultimately, the fact of using a spatial analytic transform of the original images (i.e. essentially in another dimension, that of time, rather than the dimension for which the spatial analytic transform is done) of each of the real and imaginary components makes it possible to search for a coherence that is not solely spatial or solely temporal as in the examples seen here above but a space-time combination of these images. The result then is far better.

The filtering proper can be improved not by placing a sharp limit on the analysis, into harmonics, of the real and imaginary parts beyond a given harmonic but, on the contrary, by damping the amplitudes of the harmonics greater than a harmonic of a given order, for example A3 (apodization).

SUMMARY OF THE INVENTION

An object of the invention therefore is a method for the processing of the images of an original batch of N images with at least two dimensions, to remove the noise therefrom, wherein said method comprises the following steps:

a 2D analytic transform is carried out on the images of the original batch to obtain a batch of N transformed images, each transformed image comprising a real part and an imaginary part;

the N transformed images are filtered by composing each image element of these transformed images with same image elements in the other transformed images in order to obtain a batch of filtered transformed images, and a reverse 2D analytic transform is carried out on the images of the batch of filtered transformed images to obtain a batch of N original filtered images.

BRIEF DESCRIPTION OF THE DRAWINGS

The invention will be understood more clearly from the following description and from the figures that accompany it. These figures are given purely by way of an indication and in no way restrict the scope of the invention. Of these figures:

FIG. 1 shows a schematic view of a system for the acquisition of noise-ridden digital means and of the processing applied to them according to the invention;

FIG. 2 shows a symbolic view of the processing operations carried out according to the invention to remove the noise;

FIG. 3 shows an improvement of the prior conditioning of the images with a view to their processing according to the invention;

FIG. 4 shows a schematic view of the difficulties presented by certain types of examination as well as their solution;

FIG. 5 shows the transfer function of a mode of filtering in apodization;

FIG. 6 shows an exemplary application of the invention in a particular type of medical examination.

MORE DETAILED DESCRIPTION

FIG. 1 shows a schematic view of a device for the acquisition of images that are unfortunately noise-ridden and for their processing according to the invention. This device comprises a couch 1 or patient's table on which a patient 2 is placed. This patient's heart may be monitored by a synchronization detector 3 and examined by means of a detector 4 of a gamma camera (not shown) placed fixedly against the patient's body facing the heart. The field of the detector 4 may have any shape. It is preferably rectangular and picks up an image all of whose pixels may be referenced with respect to a system of axes XY that are, for example, parallel to the edges of this field.

In another type of examination, namely a tomography, the detector 4 is shifted so as to occupy certain positions 5 and 6, that are sufficient in number (64 positions for tomographies by scintigraphy and up to 1024 positions for tomodensitometers) distributed on a half-rotation about the body of the patient 2. At each position, the detector 4 picks up a 2D image. These images are processed by a processor 7 that implements a processing method written in the form of a program 8 stored in a program memory 9.

The processed images are then displayed on a display monitor 10. They may furthermore be stored in storage memories, such as hard disks or other types of memory, and may even be processed for other purposes such as statistical assessment, specific discrimination etc. without comprising any display. The aim of the invention is to produce images, possibly visible on the monitor 10, that have less noise.

It shall be endeavoured in the rest of this explanation to describe what happens to the different images signals without going into the digitization of these image signals or into subsequent digital processing operations. Digitization is a known technique. It requires the use of analog-digital converters to convert analog signals picked up by detectors such as 4 into digital signals. The principles and implementation of the operations for the subsequent processing of the digital signals are known in the field of computers.

It is assumed, in one example that has been obtained (FIG. 2), that there are sixteen original images I1 to I16. Should the application concerned relate to a tomography, there would be 64 images. There would be even more images in other applications such as tomodensitometry or NMR tomography. Each image, for example I1, is characterized by a number of pixels fixing its resolution, for example 64×64 pixels. To each pixel there may be assigned an image signal value, for example d11, d12, d21, d22 etc. . . . as a function of the coordinates of the pixel in the image. This value of the pixel may be directly used to activate the luminance of a corresponding pixel of the monitor 10. In the invention, a first processing operation 11 is carried during which there is a passage from the original images I1 to I16 to analytic transforms of these images. These analytic transforms of these images are done image by image and therefore give transformed images. Each transformed image contains a real part R and an imaginary part J referenced by the index of the image from which it comes. Should the analytic transform be a Fourier transform, the processing to obtain these transformed images is of the following type:

$$rhk = 1/P \cdot Q \sum_{i=1}^{i=P} \sum_{l=1}^{l=Q} d_{il} \cos 2\pi(ih/P + lk/Q) \quad \text{FORMULA II}$$

for the real part and $$jhk = 1/P \cdot Q \sum_{i=1}^{i=P} \sum_{l=1}^{l=Q} d_{il} \sin 2\pi(ih/P + lk/Q)$$

for the imaginary part.

In these formulae, h and k are the indices of the image elements in each of the images R1, the real image, or J1, the imaginary image, or the following images. It is no longer possible to speak of pixels with respect to these images for these image elements are not intended, in principle, to be shown as such, even if thi could also be possible. The computed coefficients r or j indicate the values obtained by the transform at each of these points. This transformation consists of the accumulation, on the horizontal and vertical resolutions P and Q (generally 64×64), of the product of the coefficients dil of the original images multiplied by cosine or sine terms respectively corresponding to this type of transformation.

To simplify matters, an analytic (Fourier) transform may be chosen so that the resultant image elements with an index hk have the same format PQ as the original images. This is not obligatory. However it is a preferred mode if it is desired that information should not be lost. To simplify the explanation, it was assumed that there were N (N=16 in the context of heart-monitoring) images to monitor the periodic phenomena. There are therefore also N transformed images at the end of the first step 11. Each transformed image has a pair of images.

The next filtering operation could be carried out in various ways but preferably, in the invention, it is carried out as indicated here above by the temporal filtering of each of the components, namely the real and the imaginary components, of the transformed images. This is begun by two steps, 12 and 13 respectively, which may be simultaneous. The step 12, which is similar to the step 13, comprises for example the search, in each collection of the N image elements $r_{hk}$ (i.e. corresponding elements), for the real parts of the transformed images, the amplitudes of the 0 to M−1 order harmonics as well as phases of these harmonics. What is entailed here is preferably a simple breakdown into Fourier series of a periodic phenomenon even if another mode of breakdown is also possible. The following is the formula of this preferred breakdown:

$$C_{hkm} = 1/N \sum_{n=1}^{n=N} r_{hkn} (\cos 2\pi mn/N - j \sin 2\pi mn/N) \quad \text{FORMULA III}$$

with $j^2 = -1$ and $$C_{hkm} = \alpha_{hkm} + j \beta_{hkm}$$

In this expression, m designates the order of the harmonic which may be limited to N. The coefficient c therefore comprises a real part $\alpha$ and an imaginary part $\beta$. Rather than showing images of the breakdown, into Fourier series, of the transformed images in this form, it may be chosen to show them in a form compatible with the one shown in the formula I. In this case, it is possible to write:

$$a_{hkm} = \sqrt{\alpha_{hkm}^2 + \beta_{hkm}^2} \quad \text{for the amplitude} \quad \text{FORMULA IV}$$

and $$phi_{hkm} = arctg\, \beta_{hkm}/\alpha_{hkm} \text{ for the phase}$$

Similarly, coefficients $b_{hkm}$ and $psi_{hkm}$ are obtained of the Fourier series development of the elements $J_{hkm}$ of the transformed images. The harmonic breakdown shown in FIG. 2 corresponds to this last presentation. In this presentation, the totality of the real parts R and imaginary parts J of the transformed images have been transformed into generic images. The following is the expression of the terms of these generic images:

5A(t)=A₀+A₁ cos (2πt/N+Phi₁)+A₂ cos (4πt/N+Phi₂)+A₃ cos (6πt/N+Phi₃)B(t)=B₀+B₁ cos (2πt/N+Psi₁)+B₂ cos (4πt/N+Psi₂)+B₃ cos (6πt/N+Psi₃)   FORMULA V Ultimately, A(t) and B(t) represent the temporal evolution of an image element of the transformed images, after filtering.

The fact that harmonics of a higher order than three have not been chosen results in the carrying out of a temporal filtering of the high frequencies which, in principle, carry more noise. Here, this filtering is applied to a spatial breakdown of the image signals.

However, rather than completely overlooking harmonics of a higher order than a given value M, it is possible to choose the subsequent harmonics but this time with a weighting coefficient. FIG. 5 shows, for example, that for the fourth harmonic, it is possible to keep only 50% of the value of the coefficient A4 or B4 that would have been computed naturally with the formula III. This formula III indicates that, for the real part (A, PHI) and of the imaginary part (B, PSI), it has been chosen to give a harmonic breakdown with a same number of harmonics. This number is M. However, this is not necessary, and it could have been chosen to have a number of harmonics M for the real parts that is different from the number of harmonics M' for the imaginary parts.

In conformity with what has been stated further above, the value chosen for M will be substantially the square root of N. For example, when there are sixteen original images, N=16, three harmonics will be chosen in addition to the continuous component. On the contrary, when the operation relates to a 64-image tomography, eight or ten harmonics could be chosen.

The representations of the formula V enable the recomputation, in steps 14 and 15, of the filtered real parts RH and of the filtered imaginary parts JH of the transformed images R+jJ. For this purpose, it is enough to replace t, in this formula, by a value ranging from 0 to N. Possibly, it may be decided to recompose more than N images by choosing non-integer whole numbers for t. In practice, in view of the fact that sixteen images have been acquired at the outset, it will not be sought to create more than sixteen filtered transformed images: additional images would contribute no information. In other words, with the expression of the formula V, it is possible to compute each of the coefficients $rh_{hk}$ as well as each of the coefficients $jh_{hk}$ corresponding to the real and imaginary parts of the filtered, transformed images RH and JH.

With these images RH and JH, it is possible, by carrying out a reverse Fourier transform in an operation 16, to arrive at a batch of (preferably) N filtered original images represented here by the images D1 tp F16. This reverse analytic transform is of a known type. If the direct analytic transform is a Fourier transform, as indicated in the formula II, it is easy to deduce therefrom a reverse Fourier transform with the following form:

$$f_{il} = \sum_{h=1}^{h=P} \sum_{k=1}^{k=Q} (rh_{hk}(\cos 2\pi(ih/p + 1k/q) + j \cdot jh_{hk} \sin 2\pi(ih/p + 1k/q)) \quad \text{FORMULA VI}$$

The index n (image number) has not been assigned explicitly to the coefficients. It is quite clear that this formula links the image F(n) to the images RH(n) and JH(n).

FIG. 3 shows, on the lefthand side, a batch of original images that are acquired when the detector of the gamma camera occupies positions such as 4 to 6. These positions are referenced with respect to one another by the angle Θ of orientation of the main direction of the detector 4 with respect to the body 2. This main direction may be determined as the normal to the center of the detector 4. The same would be the case in tomodensitometry. The images involved are therefore X Y field images referenced by an index Θ.

Experience shows that, in this case, if the method of the invention is applied directly, the results of the invention are not as good as might have been expected. It has been realized then that, rather than carrying out the analytic (Fourier) transforms on the basis of X Y field images, it is preferable to reorganize the data thus acquired so as to obtain a set of sinograms. These are artificial images where each image element is referenced firstly by one of its coordinates (X or Y) in the field of the detector and secondly by the angle Θ of orientation of the detectors at the time of the acquisition. It can be shown, furthermore, that the results are substantially improved if sinograms are chosen such that the passing from one sinogram to another, and so on until the last sinogram, can be likened to a periodic phenomenon.

FIG. 4, for a given orientation Θ, shows the image obtained of a patient's head in the field XY of the detector. The direction Y is the direction going from the patient's feet to his head. If YΘ type sinograms (FIG. 3) are built, this means that, for each of them, only the image signals located at an x-axis point $x_i$ are taken. It is seen that, when this x-axis point goes from the left to the right of the patient's head, because of the (approximate) symmetry of this patient's head, for the higher x-axis values $x_i+$, there will be images of substantially the same type as those encountered for the previous sinograms with the x-axis value $X_i-$. This periodicity then reconstitutes the equivalent of the periodicity encountered beforehand for the cardiac cycle.

In this case, therefore, the method of the invention recommends a prior operation in which batch of images with coordinates X and Y referenced by Θ are transformed into images that will then be called original images, as understood according to the invention, with coordinates Y and e referenced by X. The type of rearrangement to be implemented is very simple. It is enough to transpose the coordinates Θ and X in the addresses of the image dots that come into play in the computations.

Since the operation concerned is a tomography operation in which 64 projections are made (Θ varies between π/64 and π) and in which the images are resolved into 64 points by 64 points, this type of transformation is very simple. The rest of the processing requires only to be adapted to take account of this modification. It can be observed however that 64 pages, by the application of Shannon's theorem, can give only a maximum of 32 harmonics in the transformed images. Since only eight to ten of them are kept as seen here above, no artefact is created.

FIG. 4 furthermore shows an image signal as it appears in amplitude at a y-axis point $Y_i$. The amplitude of this signal is noise-ridden: its trace is not even. It has been realized that it is furthermore possible to greatly improve the quality of the image displayed if, outside the useful part, namely the part limited by the x-axis values $X_{i-}$ and $X_{i+}$, the value of the image signal were to be forced to zero without taking account of the value effectively measured by the detector at this place. It is then possible to show a significant additional improvement of the quality of the images.

FIG. 6 shows a particular example of the use of the method of the invention. In particular, in the field of scintigraphy, there is an examination of the heart cavities, called a Gated Blood Pool (GPB) examination, wherein a patient's heart is monitored while he is on a pedalling machine and may give a certain degree of power of exertion. The experiment consists in applying a resistance to the pedalling so as to gradually tire out the patient and in looking at the corresponding evolution of his heart.

This type of experiment comprises, for example, six steps during which the power developed by the patient follows a stepped function in 30-watt steps. Each step of this experiment lasts for a sufficient amount of time so that a noise-free image can be acquired. At the start of each step, a dose of radioactive marker is injected into the patient's bloodstream. At the instant of this injection, starting with the adjusting of a resistance to pedalling at another value, it appears that the measurements made during the first two minutes are neither significant nor usable. Given the noises measured in each image, for each step, it is normally necessary to have a period of acquisition of the order of three minutes each time. This leads to a total duration of the experiment of 6×(2×3)= 30 minutes.

With the method of the invention, given the significant reduction of noises, one minute is enough for each step. This therefore leads to a total duration of the experiment equal to 18 minutes (6×(2+1) minutes). In the diagram of FIG. 6, solid lines 17 show the real duration with the method of the invention and lines of dashes 18 show the former duration. There is a gain in the amount of time for which the machine is used and, at the same time the examination becomes less of a trial for the patient.

Furthermore, apart from this type of examination, called a GBP with exertion, there is another normal type of GBP examination in which the patient does not pedal. With the device of the invention, it is possible to acquire an image relating to this examination as being representative of the first step of the experimentation with exertion.

Furthermore, there is an examination called a first synchronized passage examination in which, rather than working with the fixing of thallium or another tracer in the walls of the heart, works with the passage of thallium or another tracer in the heart itself. This can be done only during the first five or six heartbeats that follow the injection. In other words, there are only five or six seconds of possible accumulation of the images during which the tracer is in the heart cavities. After this, the image is rather an image of the walls (thallium fixed in the walls) and no longer an image of the passage of blood in the heart. Formerly, this type of image was almost unusable because it was excessively noise-ridden. Or else, quite simply, the number of breakdowns of steps of the cardiac cycle could not be equal to sixteen and it was necessary to cope with the motions of the heart during excessively long steps. With the invention, by limiting the operation to the first seven seconds of acquisition, it is nevertheless possible to accumulate seven values at each of the pixels of the sixteen images into which the heart motion is broken down. The result is then exploitable. It becomes easier to see the complaints affecting the patient.

In another type of experiment, synchronized tomographies are carried out so as to acquire a 3D image of the heart. In this case, to simplify the explanation, it can be assumed that 64 exposures are taken to obtain images resolved in 64 dots by 64 dots, and wherein the result will be broken down into sixteen sets of 3D tomographies, each relating to an instant that is referenced with respect to the start of the cardiac cycle. The batch of images involved is thus a batch where N is the product of the number of orientations (for example 64) multiplied by the number of steps of the cardiac cycle (for example 16). In this case, to carry out the filtering, it is possible either to choose to make false sinograms as shown in FIG. 3 or, more simply, to make a direct temporal filtering as explained at the start by the combining, for each orientation of the detector, of the transformed images broken down according to the harmonics of the cardiac pulsation. Ultimately, in this case, there are 64 times the implementation of the algorithm of FIG. 2.

Furthermore, it has been noted that the computations done digitally lead to truncations (which eliminate the least significant bits). These truncations exert a favorable additional filtering effect. The very low values are indeed set at zero by the truncation.

What is claimed is:

1. A method for the processing of the images of an original batch of N images having at least two spatial dimensions, to remove the noise therefrom, the N images of this batch representing N states of a periodic phenomenon, wherein said method comprises the following steps:

a 2D spatial analytic transform is carried out on the images of the original batch to obtain a batch of N transformed images, each transformed image comprising a real part and an imaginary part;

the N transformed images are time filtered by combining each image element of these transformed images with corresponding image elements in the other transformed images in order to obtain a batch of filtered transformed images, and a reverse 2D spatial analytic transform is carried out on the images of the batch of filtered transformed images to obtain a batch of N original filtered images.

2. A method according to claim 1 wherein, for the filtering:

there are carried out, for each collection of N points having same coordinates in these N real parts of the batch of N transformed images, harmonic breakdown operations limited to the M order harmonic of a periodic evolution of the images in the original batch of images;

there are carried out, for each collection of N points having same coordinates in these N imaginary parts of the batch of N transformed images, harmonic breakdown operations limited to the M' order harmonic of a periodic evolution of the images in the original batch of images;

there are thus obtained, for each collection of N points, 2M+1 image components;

T harmonic recompositions are carried out by combining weightings of these 2M+1 components T times with different values.

3. A method according to claim 2, wherein T=N and/or M=M'.

4. A method according to claim 3, wherein M is substantially equal to the square root of N.

5. A method according to claim 4 wherein an apodization is carried out in the recomposition.

6. A method according to claim 5, wherein the batch of original images is obtained by composing sinograms of another batch of images.

7. A method according to claim 6 wherein, each of the original batch of images containing a useful accumulated part and a non-useful part surrounding this useful part, an image signal is cancelled for the image elements surrounding this non-useful part.

8. A method according to claim 7, wherein the analytic transform is a 2D Fournier transform.

9. A method according to claim 8, wherein the transformations and the filtering are done digitally to contribute an additional filtering effect, due to the truncations of the digitization.

10. A method for the processing of the images of an original batch of N images having at least two spatial dimensions, to remove the noise therefrom, the N images of this batch representing N states of a periodic phenomenon, wherein said method comprises the following steps:

a 2D spatial analytic transform is carried out on the images of the original batch to obtain a batch of N transformed images, each transformed image comprising a real part and an imaginary part;

the N transformed images are time filtered by combining each image element of these transformed images with corresponding image elements in the other transformed images in order to obtain a batch of filtered transformed images, and wherein, for the filtering:

there are carried out, for each collection of N points having same coordinates in these N real parts of the batch of N transformed images, time harmonic breakdown operations limited to the M order harmonic of a periodic evolution of the images in the original batch of images.

11. The method of claim 10 further comprising the step of carrying out a reverse 2D analytic transform on the images of the batch of filtered transformed images to obtain a batch of N original filtered images.

12. The method of claim 10 wherein there are carried out, for each collection of N points having same coordinates in these N imaginary parts of the batch of N transformed images, harmonic breakdown operations limited to the M' order harmonic of a periodic evolution of the images in the original batch of images;

there are thus obtained, for each collection of N points, 2M+1 image components;

T harmonic recompositions are carried out by combining weightings of these 2M+1 components T times with different values.

13. A method according to claim 12, wherein T=N and/or M=M'.

14. A method according to claim 13, wherein M is substantially equal to the square root of N.

15. A method according to claim 14 wherein an apodization is carried out in the recomposition.

16. A method for the processing of the images of an original batch of N images having at least two spatial dimensions, to remove the noise therefrom, the N images of this batch representing N states of a periodic phenomenon, wherein said method comprises the following steps:

a 2D spatial analytic transform is carried out on the images of the original batch to obtain a batch of N transformed images, each transformed image comprising a real part and an imaginary part;

the N transformed images are time filtered by combining each image element of these transformed images with corresponding image elements in the other transformed images in order to obtain a batch of filtered transformed images, and wherein, for the filtering:

there are carried out, for each collection of N points having same coordinates in these N imaginary parts of the batch of N transformed images, time harmonic breakdown operations limited to the M' order harmonic of a periodic evolution of the images in the original batch of images;

there are thus obtained, for each collection of N points, 2M+1 image components;

T time harmonic recompositions are carried out by combining weightings of these 2M+1 components T times with different values.

17. The method of claim 16 wherein a reverse 2D analytic transform in carried out on the images of the batch of filtered transformed images to obtain a batch of N original filtered images.

18. A method according to claim 17, wherein the batch of original images is obtained by composing sinograms of another batch of images.

19. A method according to claim 18 wherein, each of the original batch of images containing a useful accumulated part and a non-useful part surrounding this useful part, an image signal is cancelled for the image elements surrounding this non-useful part.

20. A method according to claim 19, wherein the analytic transform is a 2D Fourier transform.

* * * * *